Patented May 11, 1926.

1,583,903

UNITED STATES PATENT OFFICE

HARRY GEORGE SCHURECHT, OF PITTSBURGH, PENNSYLVANIA, ASSIGNOR OF ONE-HALF TO HENRY THOMAS SHELLEY, TRUSTEE, OF PHILADELPHIA, PENNSYLVANIA, AND ONE-HALF TO GEORGE CASPER DOERING LENTH, TRUSTEE, OF CHICAGO, ILLINOIS.

SCUM PREVENTION.

No Drawing.   Application filed July 23, 1924.  Serial No. 727,717.

This invention relates to the prevention of scumming or efflorescence on clayware and particularly on clayware which is to be salt-glazed.

Scumming or efflorescence on clayware is caused by the deposition of soluble saline matter on the surface of the ware. The soluble salts in clays consist essentially of the sulphates and chlorides of the alkali earths and the alkalies together with soluble vanadium, chromium, manganese, iron, molybdenum and organic compounds. Of these, the soluble alkali earth sulphates are the most common sources of trouble. When ware made of clays containing these salts is dried the water brings the salts to the surface and deposits them there. In unglazed ware they form a white scum after burning and in glazed ware interfere with the glaze. In the manufacture of salt-glazed ware this deposit of soluble salt on the surface may alter the mass of clay in such a manner that it will not take a salt glaze at low temperatures and at high temperatures causes the ware to take undesirable, dull, discolored glazes.

By adding certain chemicals to clays containing these salts before the forming operations, the soluble salts may be made insoluble and thus rendered inert. It has been, and still is, the common practice to add barium carbonate for this purpose. The reaction may be expressed as follows:—

$$CaSO_4 + BaCO_3 = CaCO_3 + BaSO_4$$

There are, however, the following objections to the use of barium carbonate:

1. It does not entirely overcome scumming on certain clays, particularly those low in soluble sulphates, but high in other soluble alkali earth salts.

2. It must be added as a dry powder and therefore does not become thoroughly mixed with the clay.

3. It is only 18 to 38 percent reactive and therefore it is necessary to add 3 to 5 times as much of the carbonate as is theoretically necessary if all of it were reactive.

4. It is becoming too expensive.

It has also been proposed to use barium chloride as a precipitant for soluble sulphates. The reaction in this case may be expressed as follows:

$$CaSO_4 + BaCl_2 = CaCl_2 + BaSO_4$$

Thus although barium chloride, being more soluble than barium carbonate, is more efficiently added to the clay, it results in the formation of soluble alkali earth chlorides which are themselves soluble and cause scumming. In the case of ware which is to be salt glazed the presence of calcium or magnesium chlorides on the surface of the ware is almost as detrimental as the alkali earth sulphates, since lime on the surface of a clay will cause devitrification and hence a dullness in the salt glaze. Lime on the surface of a clay will also cause the glaze to have an unpleasing dullish, yellowish color which causes a large percentage of salt-glazed ware to be classed as seconds. And an excess of barium chloride may, of itself, cause scumming. It is therefore clear that neither barium carbonate nor barium chloride can be effectively used where the clay is high in alkali earth salts.

It is the object of the present invention to improve upon the use of barium carbonate and barium chloride in the prevention of scum and to provide a method particularly applicable to the treatment of ware which is to be salt-glazed.

I have attained this object by using soluble barium salts to precipitate the soluble sulphates, and using soluble carbonates, silicates, oxalates, etc., to precipitate the soluble alkali earths. These soluble alkali earths may be those naturally occurring in the clay or those resulting from the reaction of the soluble barium salts with the alkali earth sulphates. For example, in the barium chloride-calcium sulphate reaction illustrated above, the resultant calcium chloride can be eliminated as a source of trouble by the use of soluble (viz, alkali or ammonium) carbonates, silicates, oxalates, etc.

For clays which vary abruptly from time to time in their soluble salt content, it is necessary to add a precipitant for the excess barium compounds which may be added when this content drops. This is done by adding the same chemicals as are used to precipitate soluble lime and magnesia, namely soluble carbonates, silicates, oxalates, etc. The products of these second reactions are alkali chlorides, sulphides, etc., which, appearing on the surface of the ware, actually improve the subsequently applied glaze.

As a specific example of the precipitants discussed above, I have found that black ash (an impure grade of barium sulphide obtained by roasting barytes, barium sulphate, with coal) and soda ash are satisfactory. In adding these precipitants to the clay, I have found it advantageous first to add an excess of the barium salt, either as a powder or in solution, to the clay in the wet pans. After pugging sufficiently to thoroughly mix the barium salt with the clay, one-half of the total time which is about an amount of the carbonate sufficient to react with the soluble lime and magnesia and the excess barium salts is added either dry or in solution, and the pugging completed.

If we assume that the clay being treated contains calcium sulphate, the added barium sulphide reacts to form insoluble barium sulphate and soluble calcium sulphide. There will also be an excess of barium sulphide. The subsequent addition of sodium carbonate results in the formation of the relatively insoluble carbonates of calcium and barium and the formation of the highly soluble sulphides of sodium. These reactions may be expressed as follows:

$$CaSO_4 + BaS = CaS + BaSO_4 + BaS \text{ (excess)}$$
$$CaS + Na_2CO_3 = \overline{CaCO_3} + Na_2S$$
$$BaS + Na_2CO_3 = \overline{BaCO_3} + Na_2S$$

If instead of employing barium sulphide and sodium carbonate, barium chloride and sodium oxalate were used, the reactions, which are essentially the same as those discussed above, would be expressed as follows:

$$CaSO_4 + BaCl_2 = CaCl_2 + BaSO_4 + BaCl_2 \text{ (excess)}$$
$$CaCl_2 + Na_2C_2O_4 = \overline{CaC_2O_4} + 2NaCl$$
$$BaCl_2 + Na_2C_2O_4 = \overline{BaC_2O_4} + 2NaCl$$

These soluble sodium salts will, of course, come to the surface of the ware during drying, but, unlike the alkali earth salts, exercise a beneficent influence upon the salt glaze, combining with the clay and increasing thickness and improving the quality of the subsequently formed glaze.

The quantities of these precipitants which are added depend of course upon the quantity of soluble salts in the clay. They may advantageously be added in amounts up to two equivalents in terms of the soluble salts.

I claim:

1. The method of preventing the formation of detrimental soluble salt scum on clayware which comprises adding to the clay a precipitant to react with the soluble scumming salt to form insoluble and soluble salt products, and adding a second precipitant to render the soluble product insoluble.

2. The method of preventing the formation of soluble sulphate and soluble alkali earth salt scum on clayware which comprises adding to the clay a soluble salt of a metal which forms an insoluble sulphate to precipitate the sulphate, and a soluble salt of an acid which forms an insoluble alkali earth salt to precipitate alkali earth.

3. The method of preventing the formation of detrimental soluble salt scum on clayware which comprises adding a soluble barium salt to the clay to precipitate soluble sulphates, and adding a soluble salt of an acid which forms an insoluble alkali earth salt to precipitate any soluble alkali earths which may have resulted from the sulphate reaction, and any excess barium salt.

4. The method of preventing the formation of soluble sulphate and soluble alkali earth salt scum on clayware which comprises adding barium sulphide to the clay to precipitate the sulphates, and sodium carbonate to precipitate the alkali earths.

5. The method of preventing the formation of detrimental soluble salt scum on clayware which comprises adding barium sulphide to the clay to precipitate soluble sulphates, and adding sodium carbonate to precipitate any soluble alkali earth sulphides which may have resulted from the sulphate reaction, and any excess barium sulphide.

6. The method of preventing the formation of soluble salt scum on clayware which comprises adding to the clay in the wet pan a soluble salt of a metal which forms an insoluble sulphate to precipitate the sulphates, pugging the clay for a portion of the total requisite time, and then adding a soluble salt of an acid which forms an insoluble alkali earth salt to precipitate the alkali earths.

7. The method of preventing the formation of soluble sulphate scum on clayware which comprises adding barium sulphide to the clay in the wet pan to precipitate the sulphates, pugging the clay for about half the requisite time and the adding sodium carbonate to precipitate the alkali earths.

8. The method of preventing the formation of soluble sulphate scum on clayware which comprises adding barium sulphide to the clay before the final forming operation.

9. The method of making salt-glazed clayware which comprises forming on the surface of the ware before firing a deposit of a salt which cooperates with the glazing salt in the formation of the glaze to improve the glaze and then firing and salt-glazing the ware.

10. The method of preventing the formation of soluble sulphate and soluble alkali earth salt scum on clayware to be salt-glazed which comprises adding to the clay a soluble salt of a metal which forms an insoluble sulphate to precipitate the sulphate, and an alkali salt of an acid which forms an insoluble alkali earth salt to precipitate the alkali earth and form a soluble alkali salt.

11. The method of preventing the formation of soluble sulphate and soluble alkali earth salt scum on clayware to be salt-glazed which comprises adding barium sulphide to the clay to precipitate the sulphates, and sodium carbonate to precipitate the alkali earths and form a soluble sodium sulphide scum on the surface of the ware.

12. The method of making salt-glazed clayware which comprises forming on the surface of the ware before firing a deposit of a soluble alkali salt which cooperates with the glazing salt in the formation of the glaze to improve the glaze and then firing and salt glazing the ware.

13. The method of making salt-glazed clayware which comprises adding to the clay a soluble salt of a metal which forms an insoluble sulphate to precipitate any soluble sulphates in the clay and an alkali salt of an acid which forms an insoluble alkali earth salt to precipitate any alkali earths in the clay and form a soluble alkali salt, drying the ware and then firing and salt-glazing it.

14. The method of making salt-glazed clayware which comprises adding barium sulphide to the clay to precipitate any sulphates, and sodium carbonate to precipitate any alkali earths and form a soluble sodium sulphide scum on the surface of the ware, and then firing and salt-glazing the ware.

In testimony whereof I affix my signature.

HARRY GEORGE SCHURECHT.